(12) United States Patent
Ben Ali et al.

(10) Patent No.: US 10,356,182 B2
(45) Date of Patent: Jul. 16, 2019

(54) COMMUNICATION STACK OPTIMIZED PER APPLICATION WITHOUT VIRTUAL MACHINE OVERHEAD

(71) Applicant: Telefonaktiebolaget LM Ericsson (publ), Stockholm (SE)

(72) Inventors: Racha Ben Ali, Fremont, CA (US); Wassim Haddad, San Jose, CA (US); Heikki Mahkonen, San Jose, CA (US); Ravi Manghirmalani, Fremont, CA (US); Meral Shirazipour, San Jose, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 248 days.

(21) Appl. No.: 15/214,317

(22) Filed: Jul. 19, 2016

(65) Prior Publication Data
US 2018/0027079 A1    Jan. 25, 2018

(51) Int. Cl.
*G06F 15/167* (2006.01)
*H04L 29/08* (2006.01)
(Continued)

(52) U.S. Cl.
CPC ........ *H04L 67/141* (2013.01); *G06F 9/45558* (2013.01); *G06F 9/5077* (2013.01);
(Continued)

(58) Field of Classification Search
CPC ... H04L 67/141; H04L 67/2895; H04L 67/16; H04L 69/161; H04L 69/08; G06F 9/45558
See application file for complete search history.

(56) References Cited

U.S. PATENT DOCUMENTS

| | | | |
|---|---|---|---|
| 2002/0031142 A1* | 3/2002 | Metin | H04L 12/5602 370/463 |
| 2003/0014525 A1* | 1/2003 | DeLima | H04L 67/322 709/227 |

(Continued)

OTHER PUBLICATIONS

Heuschkel, et al., "VirtualStack: A Framework for Protocol Stack Virtualization at the Edge," 40th Annual IEEE conference on Local Computer Networks (LCN), IEEE, XP032844456, Oct. 26, 2015, pp. 386-389.

(Continued)

*Primary Examiner* — Richard G Keehn
(74) *Attorney, Agent, or Firm* — Nicholson De Vos Webster & Elliott, LLP

(57) ABSTRACT

A method and a computing device are provided for improving datacenter operation. The datacenter operation is improved by establishing differentiated communication protocol stack support as a set of nano-services. The nano-services are executed to service connections on a per application or server basis for the datacenter to reduce overhead caused by virtual machines or containers utilizing separate communication protocol stacks. The method includes receiving a request to for a server via a known network access type, from a known application type, by a known user, or a known policy, determining whether the request can be serviced by an existing nano-service for the server, and establishing a new nano-service with a differentiated communication protocol stack instance for the server, in response to the request not being serviced by the existing nano-service.

21 Claims, 5 Drawing Sheets

(51) Int. Cl.
*G06F 9/455* (2018.01)
*H04L 29/06* (2006.01)
*G06F 9/50* (2006.01)

(52) U.S. Cl.
CPC .......... *H04L 67/16* (2013.01); *H04L 67/2895* (2013.01); *H04L 69/08* (2013.01); *H04L 69/161* (2013.01)

(56) References Cited

U.S. PATENT DOCUMENTS

| | | | |
|---|---|---|---|
| 2006/0206300 A1 | 9/2006 | Garg et al. | |
| 2008/0201778 A1 | 8/2008 | Guo et al. | |
| 2009/0141692 A1* | 6/2009 | Kasslin | H04W 48/16 370/338 |
| 2009/0239469 A1* | 9/2009 | Rangarajan | H04L 67/16 455/41.2 |
| 2010/0142616 A1* | 6/2010 | Hegde | H04N 21/6437 375/240.15 |
| 2011/0208866 A1* | 8/2011 | Marmolejo-Meillon | H04L 63/0823 709/227 |
| 2014/0115578 A1 | 4/2014 | Cooper et al. | |
| 2015/0281047 A1* | 10/2015 | Raju | H04L 49/70 709/244 |
| 2015/0296020 A1* | 10/2015 | Granqvist | H04W 76/14 455/41.2 |
| 2016/0112475 A1 | 4/2016 | Lawson et al. | |
| 2016/0269425 A1 | 9/2016 | Shieh et al. | |
| 2016/0342801 A1 | 11/2016 | Sreekanti et al. | |
| 2016/0378545 A1 | 12/2016 | Ho | |
| 2017/0187818 A1* | 6/2017 | Haswell | H04L 67/2823 |
| 2017/0366455 A1* | 12/2017 | Pongracz | H04L 45/66 |

OTHER PUBLICATIONS

U.S. Appl. No. 15/214,321, Published.
U.S. Appl. No. 16/085,970, Pending.
Agache, et al., "Increasing Datacenter Network Utilisation with GRIN," USENIX Association, 12th USENIX Symposium on Networked Systems Design and Implementation (NSDI '15), May 4-6, 2015, pp. 29-42.
Apcera, Inc., "Apcera Architecture Overview," Whitepaper, Oct. 2015, downloaded from https://www.apcera.com/apcera-architecture-overview on Jul. 15, 2016, 17 pages.
Denton, J., "Neutron Networking: Neutron Routers and the L3 Agent," downloaded from https://developer.rackspace.com/blog/neutron-networking-l3-agent/ on Jul. 18, 2016, published Jan. 7, 2014, 20 pages.
Docker Inc., n.d. Web., downloaded from http://www.docker.com/ on Jul. 18, 2016, 8 pages.
Ford, et al., "TCP Extensions for Multipath Operation with Multiple Addresses," Internet Engineering Task Force (IETF), Request for Comments (RFC): 6824, Jan. 2013, 64 pages.
Johansson, I., "Congestion control for 4G and 5G access," draft-johansson-cc-for-4g-5g-01, Network Working Group, Internet-Draft, Internet Engineering Task Force (IETF), IETF Trust, Apr. 12, 2016, 14 pages.
Kerrisk, M., "Linux Programmer's Manual, Namespaces (7)," Linux man-pages project, downloaded from http://man7.org/linux/man-pages/man7/namespaces.7.html on Jul. 18, 2016, 5 pages.
Kuranda, S., "The 10 Biggest Data Breaches of 2015 (So Far)," CRN, The Channel Company, Jul. 27, 2015, downloaded from http://www.crn.com/slide-shows/security/300077563/the-10-biggest-data-breaches-of-2015-so-far.htm on Jul. 18, 2016, 11 pages.
KVM, "Virtio" n.d. Web., downloaded from http://www.linux-kvm.org/page/Virtio on Jul. 18, 2016, 2 pages.
Open vSwitch. 2014, Web., downloaded from http://openvswitch.org/ on Jul. 18, 2016, 1 page.
OpenStack., Apache 2.0, n.d., Web., downloaded from http://www.openstack.org/ on Jul. 18, 2016, 9 pages.
OpenStack Foundation, "OpenStack Operations Guide," Creative Commons Attribution 3.0 License, Mar. 19, 2016, 416 pages.
Purdy, George N., "Linux iptables Pocket Reference," O'Reilly Media, Aug. 2004, 97 pages.
Soltesz, et al., "Container-based Operating System Virtualization: A Scalable, High-performance Alternative to Hypervisors," ACM SIGOPS Operating Systems Review, vol. 41, Issue 3, Mar. 21, 2007, pp. 275-287.
Unikernal. n.p., n.d. Web., downloaded from http://unikernel.org/ on Jul. 18, 2016, 3 pages.
Van De Ven, Arjan, "An introduction to Clear Containers," Eklektix, Inc., May 18, 2015, downloaded from https://lwn.net/Articles/644675/ on Jul. 15, 2016, 23 pages.
Wiki of the Xen Project. "Xen Networking," Jan. 26, 2016, downloaded from http://wiki.xenproject.orglwiki/Xen_Networking on Jul. 18, 2016, 12 pages.
Wikipedia. "iptables," Feb. 27, 2016, downloaded from https://en.wikipedia.org/wiki/Unikernel on Jul. 18, 2016, 2 pages.
Wikipedia. "Unikernels," Jun. 9, 2016, downloaded from https://en.wikipedia.org/wiki/Unikernel on Jul. 18, 2016, 4 pages.

* cited by examiner

COMMUNICATION STACK OPTIMIZED PER APPLICATION WITHOUT VIRTUAL MACHINE OVERHEAD

TECHNICAL FIELD

Embodiments of the invention relate to the field of providing differentiated communication protocol stack services and more specifically, to the method and process of providing the differentiated communication protocol stack services via nano-services to reduce overhead.

BACKGROUND

Datacenter service providers, referred to as Infrastructure as a Service (IaaS), offer compute, storage and network resources to their customers by slicing physical hardware into virtualized tenant resources. Each tenant can subscribe to the datacenter services to obtain a required amount of virtualized compute, storage and network resources and utilize these resources based on their own requirements. Each tenant in the same datacenter expects isolation from other tenants even though underneath they share the same physical infrastructure. Tenant isolation is provided to the tenants through different mechanisms in cloud operating systems.

Isolating compute can be done through the hypervisor that manages the central processing unit (CPU) and memory resources in a server. Storage isolation can be provided by organizing physical volumes into logical volumes and granting access to these resources only to authorized tenants. Network resource isolation is a harder problem to solve as these isolated tenant networks need to reach the external networks through the same physical NIC and the datacenter switching infrastructure. It is easy to find security holes in the datacenter configuration by finding errors in this isolation that lead to "information leaks" between the tenant networks.

Some datacenters have further offered Platform as a Service (PaaS) in addition to the more basic IaaS, where a platform including such elements as a development environment, middleware, databases and similar services. Some PaaS vendors and customers utilize a hybrid configuration where various aspects of the services and applications utilized by each customer run in the datacenter while other services and application run in customer computing devices outside the data center. This hybrid approach seeks to avoid the shortcomings of traditional IaaS and PaaS solutions that cause numerous problems for PaaS customers, in particular large enterprises.

In many cases developers use PaaS to speed up the deployment of applications and services, but the implementation of these application and services are often grinding to a halt because it is unclear what the impact that these new applications and services will have on the security of the existing information technology infrastructure of the PaaS customers. In addition, managing multiple platforms to deploy new systems, apps or features becomes cumbersome.

SUMMARY

In one embodiment, a method is executed by a computing device for improving datacenter operation. The datacenter operation is improved by establishing differentiated communication protocol stack support as a set of nano-services. The nano-services are executed to service connections on a per application or server basis for the datacenter to reduce overhead caused by virtual machines or containers utilizing separate communication protocol stacks. The method includes receiving a request to for a server via a known network access type, from a known application type, by a known user, or a known policy, determining whether the request can be serviced by an existing nano-service for the server, and establishing a new nano-service with a differentiated communication protocol stack instance for the server, in response to the request not being serviced by the existing nano-service.

A further embodiment provides an electronic device for improving the datacenter operation. The datacenter operation is improved by establishing differentiated communication protocol stack support as a set of nano-services. The nano-services are executed to service connections on a per application or server basis for the datacenter to reduce overhead caused by virtual machines or containers utilizing separate communication protocol stacks. The electronic device includes a non-transitory computer-readable storage medium having stored therein a communications stack orchestrator, and a processing device coupled to the non-transitory computer-readable medium. The processing device is configured to execute the communication stack orchestrator. The communication stack orchestrator is configured to receive a request to for a server via a known network access type, from a known application type, by a known user, or a known policy, to determine whether the request can be serviced by an existing nano-service for the server, and to establish a new nano-service with a differentiated communication protocol stack instance for the server, in response to the request not being serviced by the existing nano-service.

In another embodiment, a computer-readable storage medium has instructions stored therein that when executed cause an electronic device to implement a method for improving datacenter operation. The data center operation improved by establishing differentiated communication protocol stack support as a set of nano-services. The nano-services are executed to service connections on a per application or server basis for the datacenter to reduce overhead caused by virtual machines or containers utilizing separate communication protocol stacks. The instructions causing the electronic device to perform a set of operations comprising receiving a request to for a server via a known network access type, from a known application type, by a known user, or a known policy, determining whether the request can be serviced by an existing nano-service for the server, and establishing a new nano-service with a differentiated communication protocol stack instance for the server, in response to the request not being serviced by the existing nano-service.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
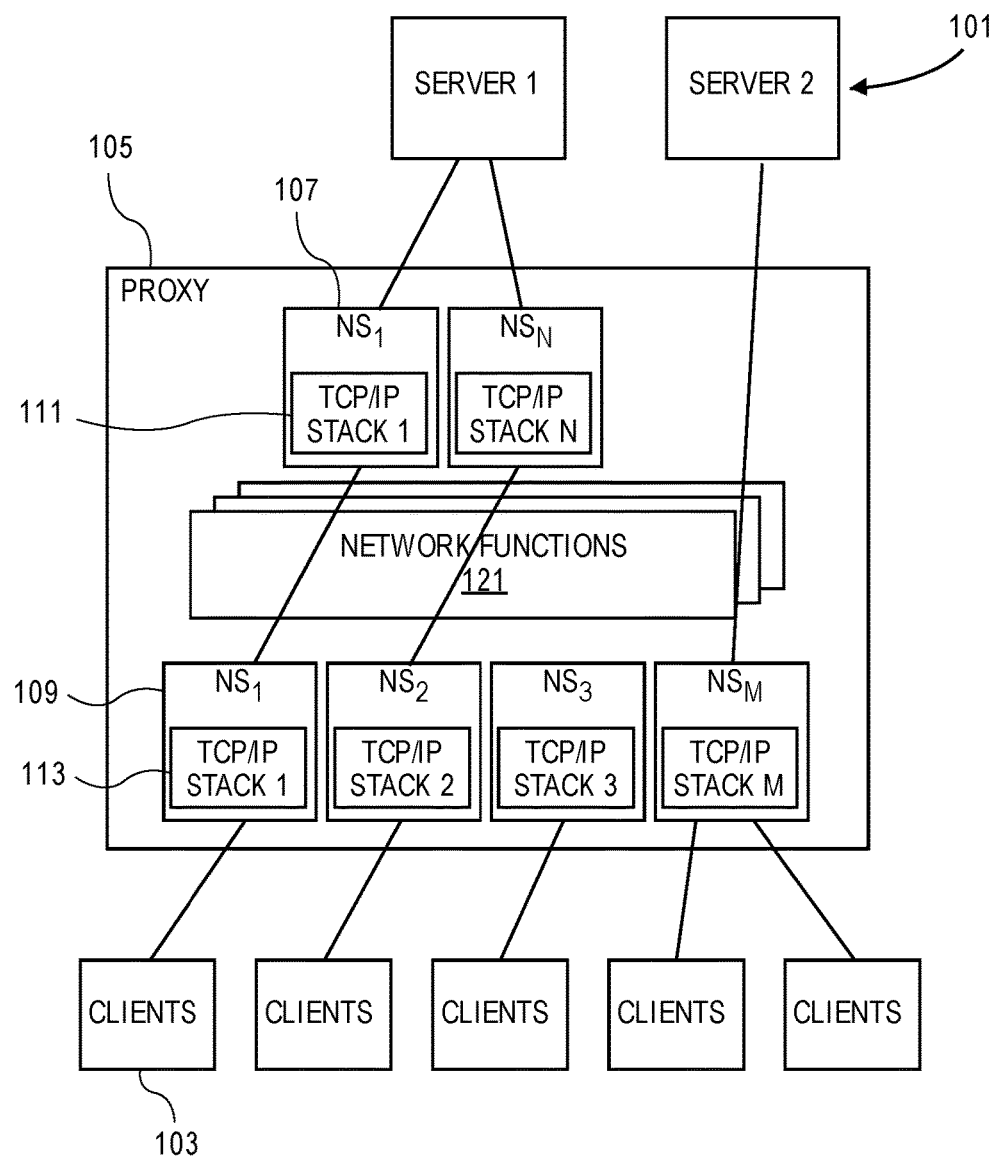
FIG. 1 is a diagram of one embodiment of a proxy device supporting per application communication with differentiated communication protocol stacks.

The following description describes methods and apparatus for optimizing the operation of communications stacks for per application communication in datacenters implementing Infrastructure as a Service (IaaS) and/or Platform as a Service (PaaS). More specifically, the embodiments provide differentiated communication protocol stack services via nano-services to reduce overhead in the implementation of these communication protocol stack services by avoiding the implementation of a complete virtual machine for each communication protocol stack. The communication protocol stack can be a transmission control protocol/Internet protocol (TCP/IP), user datagram protocol (UDP) or similar communication protocol stack. The embodiments provide a method by which a proxy device or similar computing device is configured to implement differentiated communication protocol stacks on a per application basis while avoiding the overhead of separate virtual machines for each application and/or communication protocol stack by use of nano-services for each application or service with independent communication protocol stacks implemented therein. Example applications of the differentiated communication protocol stacks include use in multiservice proxies (MSP) or multipath (MP) transmission control protocol (TCP).

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In some Platform as a Service (PaaS) systems a transmission control protocol and Internet protocol (TCP/IP) stack may run in each device or virtual machine (VM) and each TCP/IP stack could be subjected to a multitude of TCP algorithms/optimizations for any of the wide variety of classes of front-end clients-facing cloud applications. Examples: TCP adapted for clients on very high speed optical networks to low bitrate general packet radio service (GPRS) cellular link clients or even satellite clients, as well as for each of the wide variety of classes of backend applications (e.g. from emails to virtual reality and massively parallel online gaming as well as Hadoop and real time stream analytics applications, etc.). In order to provide the best optimized performance in terms of throughput, delay, jitter, packet loss, reliability, and similar metrics of performance, TCP is adapted for each of these applications. However, although micro-services applications running in containers could be isolated in different control groups with resource isolation and network namespaces, the TCP/IP stack driver is still shared by the same underlying kernel TCP/IP driver. Running specific applications in VMs provides an input/output (IO) scheduler and a TCP/IP stack driver as well as virtual network interface card (vNIC) drivers specially optimized and differentiated from what the host kernel/hypervisor operating system (OS) generally provides. This allows different applications requiring different TCP/IP optimizations to run on the same physical server. However, as mentioned before, VMs have a large memory footprint using a lot of other extra OS features that are usually not required by the application. Therefore, it would be useful to provide the same differentiated TCP/IP optimizations per cloud application, but without the use of VMs. VMs have additional drawbacks and limitations including slow boot up times, large footprints (i.e., in terms of memory and compute resource usage) relative to nano-services and similar issues that when scaled over a datacenter PaaS implementation have considerable effect on resources and operation of the datacenter.

An example of use case is a Multiservice Proxy (MSP) device implementing TCP radio network aware (RNA) congestion control algorithm (CCA). Network operators face an increasing challenge in providing a high quality of experience (QoE) for their end users, while maintaining sufficient margins to satisfy shareholder investments. One of the QoE solutions is intelligent TCP Optimization between user equipment (UE) and packet data networks (PDNs) (filtering out the TCP traffic that gains little from TCP optimization and optimizing the rest of the TCP traffic in several ways is done by a module in the MSP) that use congestion control algorithm (CCA), splitting TCP connections, and supporting all the wireless profiled TCP standards.

The MSP has a RNA (Radio Network over TCP) TCP stack. TCP RNA detects congestion and reduced signal strength based on both latency and packet loss. Using TCP RNA, many drawbacks of the standard CCAs are avoided. Moreover, TCP RNA is implemented as a TCP kernel module. When this kernel module is loaded, it registers TCP RNA among available CCAs so that it is possible to use it. MSA is used to configure default parameter values, which can be overridden by values configured in the workflow scripts of the MSP. Further, new 5G access networks and applications will call for other optimized CCAs. The problem will be the same. Currently source based routing is used to identify radio facing traffic to go to that stack. In PaaS systems it would require a separate VM to host the RNA TCP stack only. The embodiments will provide the differentiated TCP stack per flow or aggregate flow and hence achieve better efficiency.

Another use case that can benefit from the embodiments is multipath TCP (MPTCP). MPTCP is a protocol that enables communication via TCP connections where multiple paths are used between a source and destination to rather than a single path as is used in standard TCP. Currently most deployments of MPTCP in datacenters do not terminate at the end applications (web server) because they don't support it. Instead MPTCP may be implemented via a proxy device that supports the protocol such that the applications communicate with the proxy each by a single TCP connection on a single path and the proxy communicates with a server device over multiple paths. The overhead of the MPTCP proxy device can significantly reduce by the embodiments.

The embodiments provide a method and system implemented by network devices serving as proxies to reduce their overhead in providing differentiated communication protocol stacks, such as TCP/IP stacks. The embodiments may enhance datacenter management functions for enabling the dynamic instantiation of back end server TCP/IP stack based on application, access type, policy etc. Currently this is not feasible as all containers running in the same virtual machine (VM) are stuck with the same TCP/IP stack which may not be optimized for their case. The idea is to dynamically instantiate the application server with the appropriate TCP/IP stack using nano-services.

Thus, the embodiments provide the advantage of enabling TCP/IP stacks that are adapted to application type or similar conditions without the use of VMs and/or containers and the associated overhead. The embodiments avoid the use of VMs and containers for the differentiated TCP/IP stacks by use of nano-services instead of the VMs/containers to implement some of the internal jobs of the TCP/IP stack management, a few example implementations are given by way of example and not limitation. One skilled in the art would appreciate that the principles and structures of the embodiments can be applied in different contexts.

A general example implementation of the embodiments could consist in specifying from a meta-data description file (e.g. a YAML file for instance) the TCP/IP stack fine-tuned settings that might be optimized for the operation of a specific application over a specific client access network (cellular, WiFi, fixed broadband optical, etc.). These optimized settings may be used to build a nano-service image. Therefore, when a specific tenant's nano-service application for a specific type of client access network is required (on-demand) or is required for auto-scale in case of a load surge, the underlying nano-service IaaS orchestration system will quickly spin up, from the appropriate TCP-optimized nano-service image, an extra isolated server worker as a nano-service (e.g., a unikernel) within the same application and client type specific load-balancing pool. Either using the source IP address or indirectly using other meta-data, a policy based routing context could distinguish what client TCP optimized nano-service pool to use.

FIG. 1 is a diagram of one embodiment of a proxy device supporting per application communication with differentiated communication protocol stacks. The proxy device 105 can be a component of a datacenter or a separate computing or network device. The servers 101 can be any type of application servers that provide processing of data for a set of associated clients 103. A 'set,' as used herein refers to any positive whole number of items, including one item. The servers 101 can be application executed by a datacenter and can include any number or type of applications. The servers 101 can service any number or combination of clients 103. The servers 103 can communicate with each client via a single connection or via a MPTCP proxy or similar configuration can communicate with individual clients 103 via multiple connections. The connections may be TCP connections over an IP network (TCP/IP) or similar communication protocol connections.

A connection between the server 101 and its clients 103 requires that a communication protocol stack be maintained to manage the traffic and status of the connection within the datacenter or proxy device. To optimize the function of these connections it is possible to specialize the communication protocol stacks based on the type of application executed by the server 101 and/or the client 103 as each has differing traffic and connection characteristics. Thus, avoiding traditional shared communication protocol stacks in the datacenter and/or proxy device shared across applications in favor of separate differentiated communication protocol stacks enables the optimization of these connections between the servers 101, and clients 103, in some cases via the proxy devices 105.

The proxy devices 105 can be components within a data center, separate network devices outside of a data center or similar computing devices. A set of proxy devices 105 can implement the functions and processes described herein or in other embodiments the functions and processes are implemented in other devices or within other components of the datacenter. In some embodiments, the proxy device 105 may implement a set of nano-services 107, 109 that execute the communication protocol stacks 111, 113 for each connection between the servers 101 and the clients 103. As used herein, a nano-service is a light weight program that is instantiated by an orchestrator where the nano-service has less overhead and compute resource requirements than a virtual machine and/or container, because the nano-service does not include unnecessary general code and data structures for the task it implements. In one embodiment, the nano-services are implemented as unikernels having configured therein a set of functions. In some embodiments, the nano-services are immutable such that they cannot be modified after they are instantiated. Thus, nano-services provide a secure execution of functions that prevents malicious modification and that isolates the operation of one function from another such that the compromise of one nano-service and its functions do not affect the security of other nano-services and the associated servers and clients.

The nano-services 107, 109 and the differentiated communication protocol stacks 111, 113 can have any ratio n:m to the servers, clients and to one another. Where a proxy device is present, as shown in FIG. 1, separate nano-services 107, 109 may manage the communication protocol stack for connections between the server 101 and the proxy device 105 and the proxy device 105 and the clients 103. In other cases, a single differentiated communication protocol stack may be present between the server 101 and client 103. The proxy device 105 can also implement a set of network functions 121. These network functions 121 can process the data traffic between the servers 101 and client 103, for example implementing the MPTCP or similar functions.

In the example of FIG. 1, Server 1 communicates with a set of clients via a set of nano-services (NS1-*n*) 107 that implement differentiated TCP/IP stacks (1-*n*), pass the data through a set of network functions 121 to a set of nano-services (NS1-*m*) that implement a set of differentiated TCP/IP stacks(1-*m*) before passing the data traffic to the set of clients 103. In contrast, the Server 2 does not utilize a differentiated communication protocol stack at the proxy device before the data traffic is processed by the network functions 121. Instead, the data traffic is processed by the nano-services 109 that implement the communication protocol stack between the server and clients. Similarly, all of the connections at the proxy device 105 or in similar components are not processed by network functions 121, rather, any combination network functions 121 can be configured to process any set of the connections between the servers 101 and the clients 103, including connections that are not processed by any network functions 121. Thus, one skilled in the art would appreciate that the principles, functions and structures of the embodiments can be adapted for any combination or permutation of the provided examples described with relation to FIG. 1.

Figure 2:
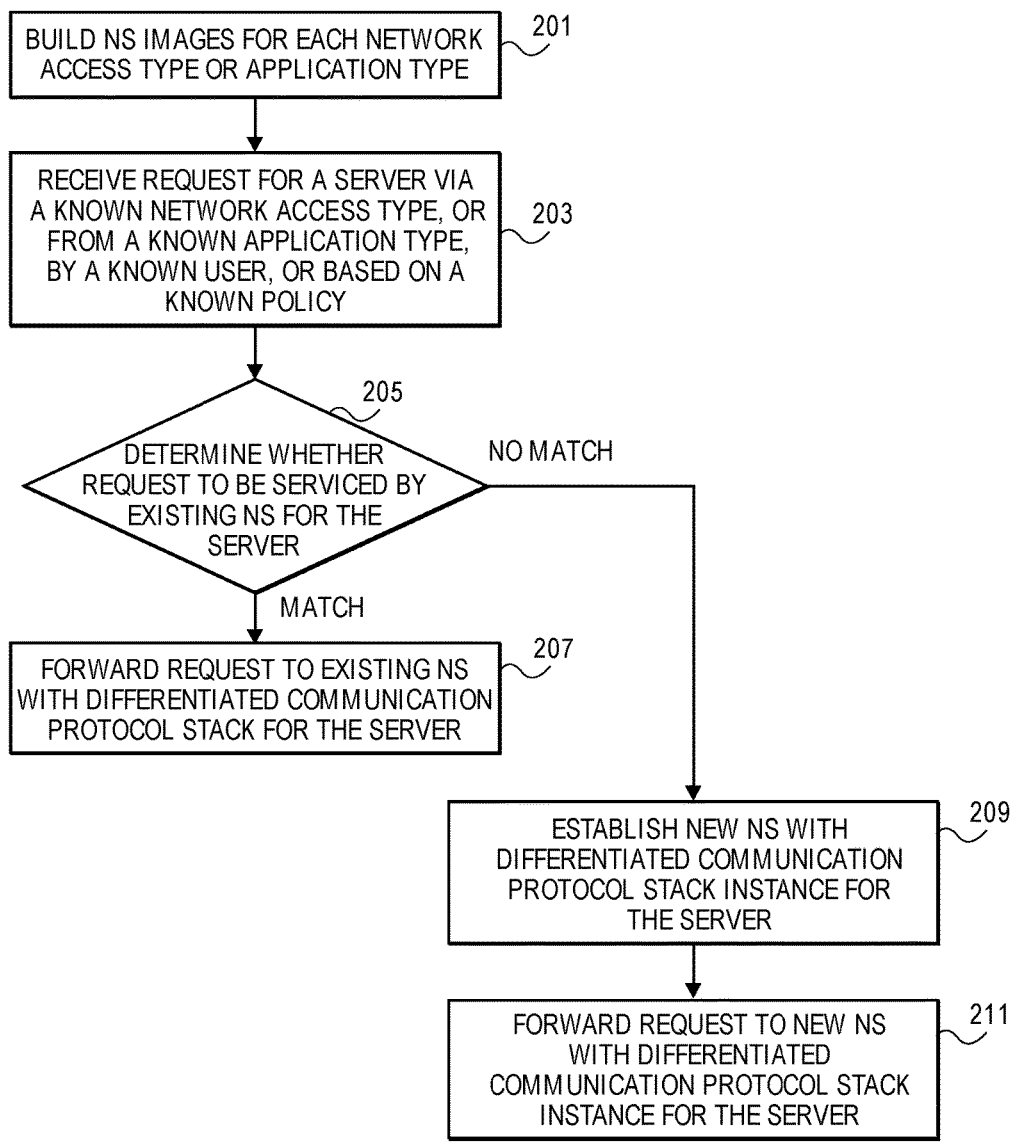
FIG. 2 is a flowchart of one embodiment of a process for configuring differentiated communication protocol stacks.

FIG. 2 is a flowchart of one embodiment of a process for configuring differentiated communication protocol stacks. The process of configuring nano-services to provide differentiated communication protocol stacks may begin with the building of nano-service images for each network access or application type (Block 201). The nano-services and the optimization of the communication protocol stacks provided by the nano-services can be specialized for each application, network access type, on a per user basis or based on a defined policy where the nano-services are configured in any manner to minimize overhead or to speed throughput. Example applications include radio network over TCP and similar applications of TCP or TCP/IP. The nano-services may be immutable code once instantiated, but may be configured at instantiation to fit the application or network access type. A nano-services orchestrator may implement this process, however, any component can be configured to implement any aspect of the process. The build of the nano-service images can be automated by an analysis of the application, application traffic, network access function or similar process. In other embodiments, the nano-service images are partially or wholly configured by a network administrator or similar entity. For example, the orchestrator may build initial hypertext transfer protocol (HTTPs)/TCP proxy/router nano-service (NS) images, optionally with injected secure socket layer (SSL) keys/certificates, customized configurations (for each known network access type and/or application type) and upload and register them in an image registry. Nano-service images or builds can be stored in any type of data structure or data store including databases, registries and similar storage structures.

The orchestrator may receive a request for or from a server via a known network access type, from a known application, on a per user basis or based on a defined policy (Block 203). For example, a new request may enter the datacenter identifying an application of a known type (e.g., filtered through a domain name service (DNS)/destination based IP router nano-service). The request is coming from a known network access type (e.g., filtered through a source based IP router NS). The orchestrator can determine whether an existing (i.e., executing nano-service) can service the request for the server, application or network access type or on a per user basis as well as based on a defined policy. The orchestrator can track the executing nano-services on a per application or server basis or can similarly track the available nano-services (Block 205).

If a matching nano-service for the server is executing that can service the request, then the request can be assigned to that nano-service (Block 207). For example, if a client connection is being established for a specific application type where a nano-service or set of nano-services that can implement a communication protocol stack between the server and the client is already executing, then another connection with a new client can be established with the existing nano-service and communication protocol stack. Identifying an existing matching nano-service can involve matching an application type, network access type or similar characteristics with the existing executing nano-service images or builds. In a further example, the request may hit an existent TCP-customized HTTPs/TCP proxy/router. If its most recently measured expected turnaround time is below a threshold, the request may be served by the existing instance. Otherwise the orchestrator may buffer the request and proceed to instantiate a new instance as discussed below to service the request. The triggering threshold for instantiating a new instance can be any type of threshold using any available metric. In one embodiment, the threshold is estimated to be equal or less than the boot up time+service time (i.e. without waiting time).

However, if no existing nano-service for the server is operating that can service the request, then the process instantiates or similarly begins execution of a new nano-service and assigns the request to this nano-service to be serviced (Block 209). The process may identify a nano-service build or image to instantiate based on the application type, network access type, on a per user basis, based on a defined policy or based on similar characteristics identified by the request. In one example, the request may be put in a buffer and a new HTTPs/TCP proxy/router instance is created. The new instance is created from the same TCP-customized image of the instance running in this example, but with a further optimized TCP configuration file. The latter is deduced from the reported monitored TCP state in the previous instance. Then, the new instance is booted up quickly. Optionally, the process selects a user/client/server dedicated instance (hardware not shared with other users/clients/servers) or user-shared instance (provided the underlying hardware supports memory encryption for multi-tenancy isolation against hypervisor bugs/breaches). Once the new nano-service is instantiated, then the request can be forwarded to be serviced by the new nano-service (Block 211). The nano-service build or image that is selected may be configurable before execution, however, in some embodiments the nano-service becomes immutable after it has been instantiated to prevent malicious corruption.

After the configuration of the nano-services providing differentiated communication protocol stacks, the nano-services may subsequently manage the data traffic between the server and the client according to the communication protocol (e.g., TCP/IP or similar communication protocol stack) where the communication protocol stack may be modified from standard operation to enhance and optimize the function of the communication protocol stack for the application or function of the server.

Figure 3:
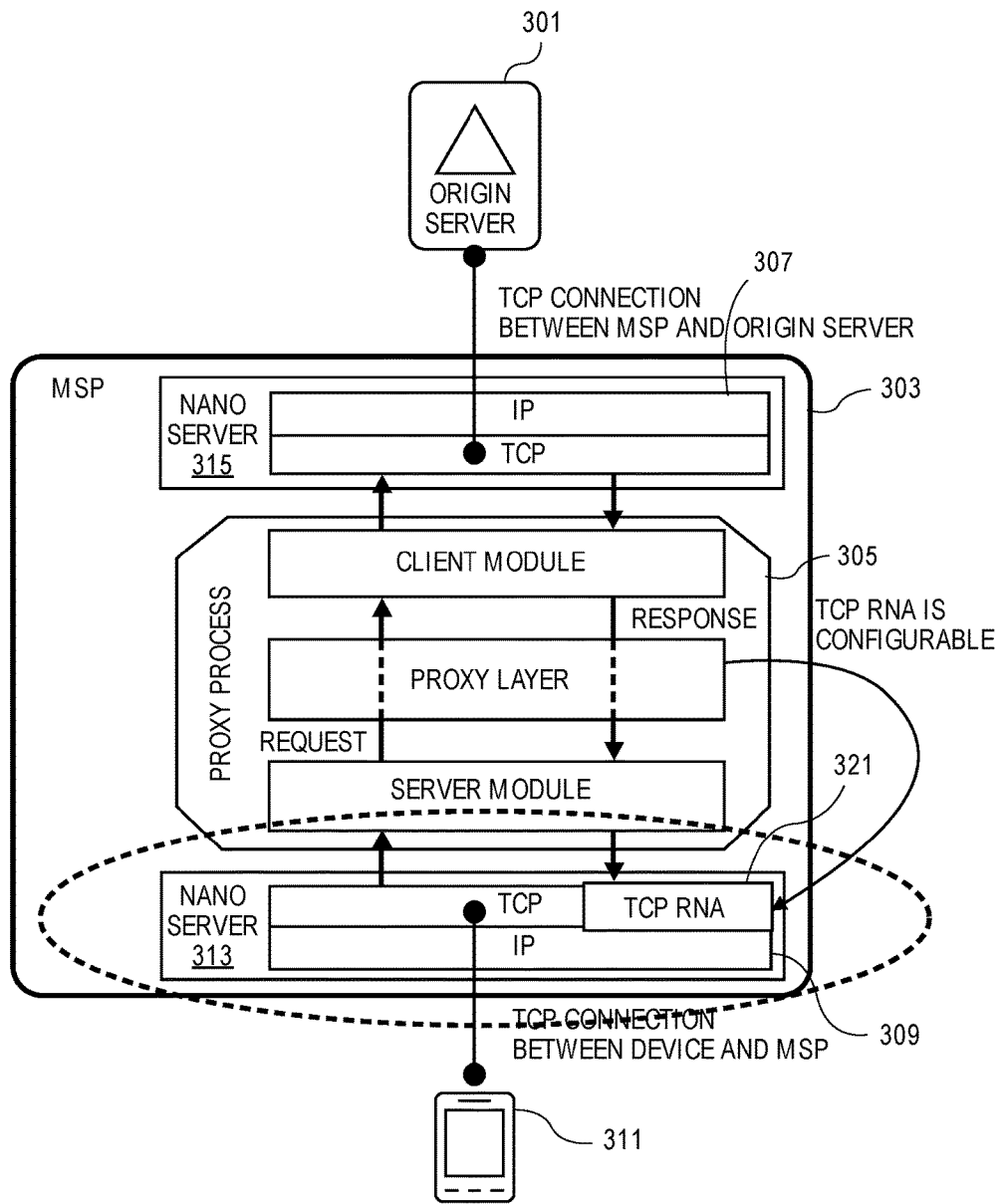
FIG. 3 is a diagram of one embodiment of a multiservice (MSP) implementing differentiated transmission control protocol/Internet protocol (TCP/IP) stacks.

FIG. 3 is a diagram of one embodiment of a multiservice proxy (MSP) implementing differentiated transmission control protocol/Internet protocol (TCP/IP) stacks. In particular, the case of an MSP and TCP Radio Network Aware (RNA) Congestion Control Algorithm (CCA). The embodiments can be applied to be utilized in an MSP for TCP RNA CCA where the use of differentiated TCP/IP stack (CCA) on a per flow basis (or aggregate of flows) by using unikernels is implemented. FIG. 3 shows as example the MSP deployment and how the proxy function decouples the TCP stack into two parts, with one TCP/IP stack 309 in a nano-service 313 facing the user equipment (UE) 311 and the other TCP/IP stack 307 in a nano-service 315 facing the origin server 311. The UE 311 is connected to the MSP 303 via a radio network. In one embodiment, the TCP/IP stack 309 facing the radio network and the UE is where nano-services (e.g., implemented as unikernels) may be utilized to offer a differentiated TCP/IP stack that is specific to RNA with a specialized TCP RNA component 321. In other embodiments, the TCP/IP stack 307 facing the origin server 311 can be similarly specialized.

Figure 4:
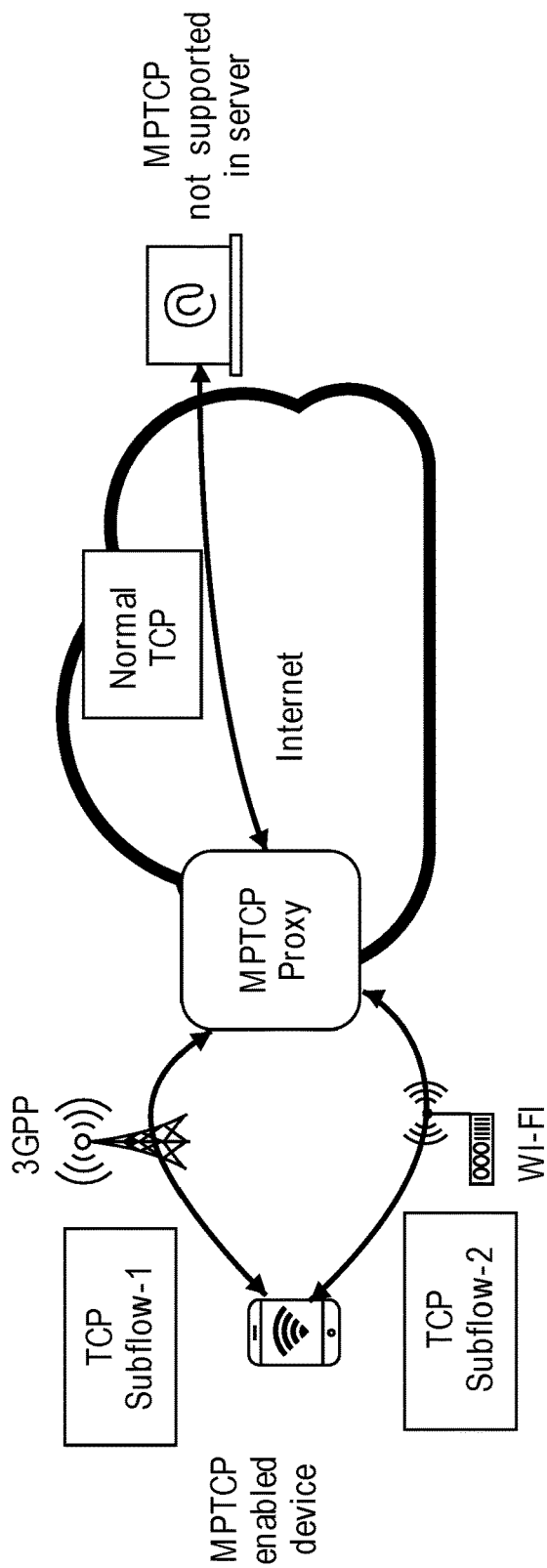
FIG. 4 is a diagram of one embodiment of a multipath TCP (MPTCP) proxy implementing differentiated communication protocol stacks.

FIG. 4 is a diagram of one embodiment of a multipath TCP (MPTCP) proxy implementing differentiated communication protocol stacks. Another example application of the embodiments is a web server application that does not support MPTCP. As shown in FIG. 4 below, a server/application can be made MPTCP compliant by using a unikernel or similar nano-service per session to do the multiplexing of the multiple TCP connections into one before serving them to the application at the server. Thus, an MSP can be enabled to have another function to act as MPTCP proxy. This function can further be enhanced by using nano-services to allow a more elastic and customized (per application) TCP/IP stack.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 5:
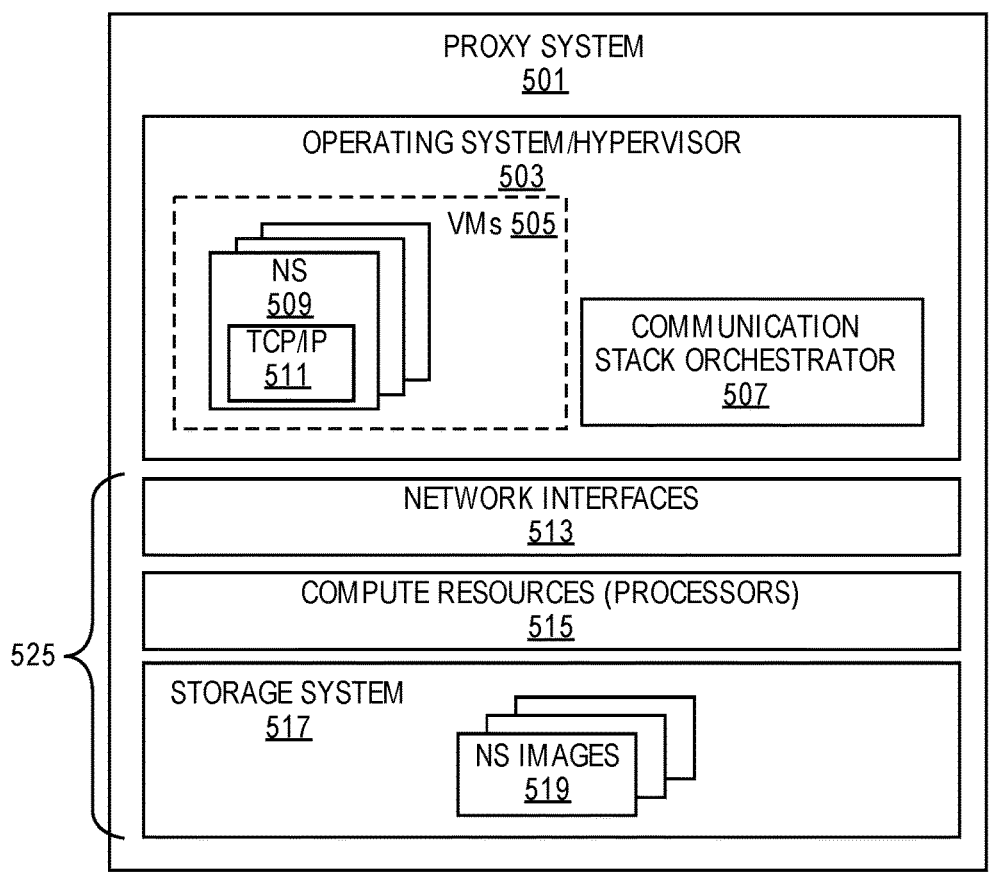
FIG. 5 is a diagram of one embodiment of the architecture of a proxy device implementing differentiated communication protocol stacks.

FIG. 5 is a diagram of one embodiment of the architecture of a proxy device implementing differentiated communication protocol stacks. The architecture is provided by way of example and not by way of limitation. The proxy system 501 can be a separate computing or network device or can be part of a set of resources in a datacenter or similar cloud computing system. The proxy system 501 can be accessible to other tenants and programs in the datacenter. The embodiments implement an operating system or hypervisor 503 that manages the access to the hardware resources 525 of the proxy system 501. The operating system or hypervisor 503 can be any operating system or hypervisor and there may be any combination of the operating systems and hypervisors in the proxy system 501 and a datacenter more generally to manage access to the hardware resources 525.

The operating system or hypervisor 503 can instantiate or execute a set of nano-services 509 to provide a set of differentiated communication protocol stacks 511 (e.g., illustrated as TCP/IP stacks) where each of the nano-services has a specialized and optimized communication protocol stack on a per application, network access or similar connection characteristic. In some embodiments, a set of virtual machines 505 may also be implemented on which some of the set of nano-services 509 are executed. The nano-services 509 can be implemented as unikernels or similar code that has limited overhead in terms of compute resources, quick boot times and similar advantages over separate virtual machines or heavier footprint implementations for providing communication protocol stacks on a per application, server, or client basis.

The nano-services 509 can be managed and instantiated by a communication stack orchestrator 507 or similar orchestrator component that identifies the type of nano-service to be utilized and the conditions for the utilization of the nano-service, loads the corresponding nano-service build or image and initiates the execution and configuration of the nano-service to service a request for a server, application or network access type. The orchestrator 507 can be executed by the operating system or hypervisor 503 within the proxy system 501 or remote from the proxy system.

The proxy system 501 as a separate device or as a part of a datacenter is associated with a set of hardware components 525 that include network interfaces 513, compute resources (e.g., a set of processors) 515, and a set of storage devices that form a storage system 519. The network interfaces 513 can be any number or variety of network interfaces including optical, wired or wireless network physical medium interconnects that enable the proxy device 501 to communicate with other devices within the data center or external to the datacenter such as clients and user equipment. The compute resources 515 can be a set of general or application specific processors (e.g., central processing units (CPUs) or application specific integrated circuits (ASICs) or similar devices. The compute resources 515 can execute the operating system and hypervisor 503 as well as the nano-services 509 and other software of the proxy system 501 and datacenter.

The storage system 517 can be a set of optical, solid state, magnetic or similar dynamic or static storage devices in any combination or configuration. The storage system 517 can be accessed and utilized for the storage of the software components of the proxy system. The storage system 517 is a computer-readable storage medium. The instructions stored in the computer-readable storage medium enable the electronic device of the proxy system 501 to implement the methods and processes described herein. The instructions cause the electronic device to perform a set of operation as described herein to implement the differentiated communication protocol stacks optimized for minimal overhead and to function without the need for separate virtual machines tied to each of the communication protocol stacks.

While embodiments have been described that implement differentiated communication protocol stack services using nano-services, one skilled in the art would appreciate that this is provided by way of example and not limitation. Functions for the communication protocol stack instantiation and operation or similar functions can also be similarly implemented by using nano-services that minimize the overhead entailed in using virtual machine or containers to provide communication protocol stack support.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by a computing device for improving datacenter operation by establishing differentiated communication protocol stack support as a set of nano-services that are executed to service connections on a per application or server basis for the datacenter to reduce overhead caused by virtual machines or containers utilizing separate communication protocol stacks, the method comprising:
   receiving a request for a server via a known network access type, from a known application type, by a known user, or a known policy;
   determining whether the request can be serviced by an existing nano-service for the server; and
   establishing a new nano-service with a differentiated communication protocol stack instance for the server, in response to the request not being serviced by the existing nano-service, wherein the new nano-service or existing nano-service are unikernels separate from an operating system of the computing device.

2. The method of claim 1, further comprising:
   building a set of nano-service images for each network access type, each server application type, each user, or each policy.

3. The method of claim 2, further comprising:
   storing the nano-service images in a storage system of the datacenter.

4. The method of claim 1, further comprising:
   forwarding the request to the new nano-service with the differentiated communication stack instance for the server.

5. The method of claim 1, wherein the computing device is a multiservice proxy that executes a proxy process for data traffic between the server and a set of clients.

6. The method of claim 1, wherein the nano-service implements multipath transmission control protocol functions for the server.

7. The method of claim 1, wherein the communication protocol stack is a transmission control protocol and Internet Protocol (TCP/IP) stack.

8. An electronic device for improving datacenter operation by establishing differentiated communication protocol stack support as a set of nano-services that are executed to service connections on a per application or server basis for the datacenter to reduce overhead caused by virtual machines or containers utilizing separate communication protocol stacks, the electronic device comprising:
   a non-transitory computer-readable storage medium having stored therein a communications stack orchestrator; and
   a processing device coupled to the non-transitory computer-readable medium, the processing device configured to execute the communication stack orchestrator, the communication stack orchestrator configured to receive a request for a server via a known network access type, from a known application type, by a known user, or a known policy, to determine whether the request can be serviced by an existing nano-service for the server, and to establish a new nano-service with a differentiated communication protocol stack instance for the server, in response to the request not being serviced by the existing nano-service, wherein the new nano-service or existing nano-service are immutable light weight programs separate from an operating system of the computing device.

9. The electronic device of claim 8, wherein the communication stack orchestrator is further configured to build a set of nano-service images for each network access type, each server application type, each user, or each policy.

10. The electronic device of claim 9, wherein the communication stack orchestrator is further configured to store the nano-service images in a storage system of the datacenter.

11. The electronic device of claim 8, wherein the communication stack orchestrator is further configured to forwarding the request to the new nano-service with the differentiated communication stack instance for the server.

12. The electronic device of claim 8, wherein the electronic device is a multiservice proxy that executes a proxy process for data traffic between the server and a set of clients.

13. The electronic device of claim 8, wherein the nano-service implements multipath transmission control protocol functions for the server.

14. The electronic device of claim 8, wherein the communication protocol stack is a transmission control protocol and Internet Protocol (TCP/IP) stack.

15. A non-transitory computer-readable storage medium having instructions stored therein that when executed cause an electronic device to implement a method for improving datacenter operation by establishing differentiated communication protocol stack support as a set of nano-services that are executed to service connections on a per application or server basis for the datacenter to reduce overhead caused by virtual machines or containers utilizing separate communication protocol stacks, the instructions causing the electronic device to perform a set of operations comprising:
   receiving a request for a server via a known network access type, from a known application type, by a known user, or a known policy;
   determining whether the request can be serviced by an existing nano-service for the server; and
   establishing a new nano-service with a differentiated communication protocol stack instance for the server, in response to the request not being serviced by the existing nano-service, wherein the new nano-service or existing nano-service are unikernels separate from an operating system of the computing device.

16. The non-transitory computer-readable storage medium of claim 15, having further instructions stored therein, which when executed by the electronic device perform additional operations comprising:
   building a set of nano-service images for each network access type, each server application type, each user, or each policy.

17. The non-transitory computer-readable storage medium of claim 16, having further instructions stored therein, which when executed by the electronic device perform additional operations comprising:
   storing the nano-service images in a storage system of the datacenter.

18. The non-transitory computer-readable storage medium of claim 15, having further instructions stored therein, which when executed by the electronic device perform additional operations comprising:
   forwarding the request to the new nano-service with the differentiated communication stack instance for the server.

19. The non-transitory computer-readable storage medium of claim 15, wherein the electronic device is a multiservice proxy that executes a proxy process for data traffic between the server and a set of clients.

20. The non-transitory computer-readable storage medium of claim 15, wherein the nano-service implements multipath transmission control protocol functions for the server.

21. The non-transitory computer-readable storage medium of claim 15, wherein the communication protocol stack is a transmission control protocol and Internet Protocol (TCP/IP) stack.

* * * * *